United States Patent
Hundley et al.

(10) Patent No.: US 12,122,945 B2
(45) Date of Patent: Oct. 22, 2024

(54) MULTILAYER FILMS HAVING FOAMED POLYOLEFIN BASED ADHESIVE COMPOSITION(S)

(71) Applicant: EQUISTAR CHEMICALS, LP, Houston, TX (US)

(72) Inventors: Mick C. Hundley, Loveland, OH (US); Gang Zhang, Cincinnati, OH (US); William R. Podborny, Cinncinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 116 days.

(21) Appl. No.: 17/691,734

(22) Filed: Mar. 10, 2022

(65) Prior Publication Data

US 2022/0290010 A1    Sep. 15, 2022

Related U.S. Application Data

(60) Provisional application No. 63/160,461, filed on Mar. 12, 2021.

(51) Int. Cl.
| | |
|---|---|
| C09J 5/08 | (2006.01) |
| B29C 44/20 | (2006.01) |
| B29C 48/00 | (2019.01) |
| B29C 48/21 | (2019.01) |
| B29C 48/22 | (2019.01) |
| B29C 48/88 | (2019.01) |
| B32B 7/12 | (2006.01) |
| B32B 27/08 | (2006.01) |
| B32B 27/30 | (2006.01) |
| B32B 27/32 | (2006.01) |
| B32B 27/34 | (2006.01) |
| C08J 9/06 | (2006.01) |
| C09J 5/06 | (2006.01) |
| C09J 7/22 | (2018.01) |
| C09J 123/02 | (2006.01) |
| B29K 23/00 | (2006.01) |
| B29K 105/00 | (2006.01) |
| B29K 105/04 | (2006.01) |

(52) U.S. Cl.
CPC ............... *C09J 5/08* (2013.01); *B29C 44/20* (2013.01); *B29C 48/022* (2019.02); *B29C 48/21* (2019.02); *B29C 48/22* (2019.02); *B29C 48/9135* (2019.02); *B32B 7/12* (2013.01); *B32B 27/08* (2013.01); *B32B 27/306* (2013.01); *B32B 27/32* (2013.01); *B32B 27/34* (2013.01); *C08J 9/06* (2013.01); *C09J 5/06* (2013.01); *C09J 7/22* (2018.01); *C09J 123/025* (2013.01); *B29K 2023/06* (2013.01); *B29K 2023/12* (2013.01); *B29K 2105/0097* (2013.01); *B29K 2105/04* (2013.01); *B32B 2307/732* (2013.01); *C08J 2323/02* (2013.01); *Y10T 428/249984* (2015.04); *Y10T 428/249985* (2015.04); *Y10T 428/249991* (2015.04); *Y10T 428/2843* (2015.01)

(58) Field of Classification Search
None
See application file for complete search history.

(56) References Cited

U.S. PATENT DOCUMENTS

| | | | | |
|---|---|---|---|---|
| 4,059,714 | A * | 11/1977 | Scholl | B29C 65/4815 261/DIG. 26 |
| 4,156,754 | A * | 5/1979 | Cobbs, Jr. | C08J 9/12 261/DIG. 26 |
| 7,070,852 | B1 * | 7/2006 | Reiners | B32B 27/32 428/318.6 |
| 2002/0127389 | A1 * | 9/2002 | Hanada | B32B 27/32 428/318.6 |
| 2005/0058791 | A1 * | 3/2005 | Moehlenbrock | B32B 27/08 428/138 |
| 2007/0054142 | A1 | 3/2007 | Lee et al. | |
| 2011/0027583 | A1 * | 2/2011 | Lee | B32B 27/302 428/355 R |
| 2015/0267087 | A1 * | 9/2015 | Botros | C09J 123/14 524/151 |
| 2017/0198103 | A1 | 7/2017 | Lee | |

FOREIGN PATENT DOCUMENTS

EP         3590705 A1 *  1/2020  ............ B32B 27/08

OTHER PUBLICATIONS

Definition "blowing agent", Merriam Webster online dictionary, Sep. 12, 2023 (Year: 2023).*
International Search Report and Written Opinion Mailed Jun. 22, 2022 (Jun. 22, 2022) for corresponding PCT/US2022/019774.
Feng Jingxing et al: "High oxygen barrier multilayer EVOH/LDPE film/foam", Journal of Applied Polymer Science, vol. 135, No. 26, Mar. 12, 2018 (Mar. 12, 2018), p. 46425, XP055865578, US ISSN: 0021-8995, DOI: 10.1002/app.46425 Retrieved from the Internet: URL:https://onlinelibrary.wiley.com/doi/full-XML/10.1002/app.46425> abstract; p. 1 of 9, col. 2, paragraph 2; p. 2 of 9, experimental, materials and film/foam processing.

* cited by examiner

*Primary Examiner* — Anish P Desai

(57) ABSTRACT

A multilayer film having enhanced toughness and optical properties is provided. The multilayer film includes a base layer, an outer layer, and a tie layer between the base layer and the outer layer. The multilayer film can also include additional layers. Methods for making such multilayer films are also provided. Multilayer films according to the present invention are particularly useful packaging applications where rupture resistance and high clarity are desirable.

15 Claims, No Drawings

MULTILAYER FILMS HAVING FOAMED POLYOLEFIN BASED ADHESIVE COMPOSITION(S)

This application is the Non-Provisional Patent Application, which claims benefit of priority to U.S. Provisional Application No. 63/160,461, filed Mar. 12, 2021, the contents of which are incorporated herein by reference in their entirety.

FIELD OF THE INVENTION

This invention relates to a multilayer film structure including a foamed adhesive composition as a tie layer between two other layers. Multilayer films including the foamed adhesive tie layer exhibit improved toughness and optical properties compared to multilayer film structures with conventional tie layers. The invention further relates to a method for manufacturing the multilayer film structure having a tie layer comprising the foamed adhesive composition.

BACKGROUND OF THE INVENTION

Tie-layer adhesives are used to bond polyolefins to dissimilar substrates in multilayer, co-extruded structures, particularly for blown and cast film, extrusion coating, blow molding, sheet extrusion, wire and cable, pipe, and other industrial applications. In particular, the adhesives are useful for bonding plastic, wood, glass, paper, composite, metal substrates, and incompatible polymers. Tie-layer adhesives can be used in lamination, coextrusion, extrusion coating, and other processes.

The tie-layer adhesive is typically made from and/or contains a polyolefin base resin, which may or may not be the predominant component, and a grafted polyolefin. The grafted polyolefin is produced by reacting a polyolefin with an unsaturated monomer at elevated temperatures with or without a free radical initiator. Commercially available tie-layer adhesives include Plexar™ resins, products available from LyondellBasell, which comprise anhydride-modified polyolefins.

Multilayer films and sheets are widely used for food packaging applications as well as packaging of bulk materials. Depending on the intended application, the number and arrangement of resin layers and the type of resins employed will vary. Polyethylene resins are often included as one of the layers for food contact and for sealing properties. Ethylene-vinyl-alcohol (EVOH) copolymers and polyamides (nylons) are widely used as oxygen barrier layers. It would be desirable to improve toughness and clarity of a multilayer film structure with an improved tie layer without adding thickness or using more expensive polymers for the existing performance layers of the structure. However, adhering dissimilar resin layers in multilayer films and sheets is always challenging.

Improved tie-layer adhesive compositions suitable for use in making multilayer structures with good adhesion, high clarity, and improved toughness are needed. A valuable approach would avoid expensive additives and performance tradeoffs. Ideally, improved tie-layer adhesives could be made using economical starting materials, commonly-used equipment, and familiar techniques.

U.S. Patent Publication No. 2017/0335149 discloses polyolefin-based adhesive compositions formed by melt blending olefin-based polymers with functionalized polyolefins and use of the adhesive composition as a tie layer in multilayer structures. U.S. Pat. No. 10,053,574 discloses adhesives containing linear low-density polyethylene grafted with maleic anhydride and use of such adhesives as a tie layer in multilayer structures.

However, a continuing need exists for multilayer structures containing layers of polyethylene, propylene polymers, styrenic polymers, and/or polar polymers, such as EVOH or nylon, having a common tie layer with the capability of adhering dissimilar layers in the structure, while maintaining or improving mechanical and/or optical properties.

SUMMARY OF THE INVENTION

In general, the present disclosure relates to multilayer structures that contain a base layer, an outer layer, and a tie layer disposed between the base layer and the outer layer. The tie layer comprises a foamed polyolefin-based adhesive composition. A polyolefin-based adhesive composition is foamed, as defined herein, by application of the following steps.

In some embodiments, a polyolefin-based adhesive composition and a gas soluble in the polyolefin-based adhesive composition are added to an extruder. Mixing of the polyolefin-based adhesive composition and the gas is implemented in the extruder at pressure and temperature conditions sufficient to form a mixture of the melted polyolefin-based adhesive composition and dissolved gas. The mixture of the melted polyolefin-based adhesive composition and dissolved gas is then discharged from the extruder through a die attached to the extruder. Discharge of the material through the die reduces the pressure of the mixture an amount sufficient to produce a matrix of melted polyolefin-based adhesive composition comprising a dispersed phase of gas cells or bubbles.

The melted polyolefin-based adhesive composition containing dissolved gas is discharged simultaneously with and proximate to discharge, from dies fed by separate extruders, of melted material that will form the base layer and the outer layer. Optionally, one of both outer layers could be a nonpolymeric substrate instead of a polymer. The die discharges are arranged to coextrude layers from the plurality of dies to form a multilayer film with the tie layer disposed between and coextensively adherent to both the base layer and the outer layer. The rate at which the multilayer extrudate cools is controlled to induce a higher enthalpy state in the tie-layer matrix, which results in collapse of at least a portion of the gas cells or bubbles in the tie layer before the matrix solidifies. The bubbles are allowed to collapse by controlled cooling of the extrudate. This controlled cooling allows relaxation of internal stresses as demonstrated by the higher final enthalpy state of the tie-layer matrix.

In some embodiments, the addition of gas to the extruder is accomplished by thermal decomposition of a chemical foaming agent. Other embodiments use a physical foaming agent, wherein gas is injected into the extruder from an external source. Chemical and physical foaming agents can be employed alone or with nucleating agents to promote more uniform bubble distribution.

One or more embodiments include multilayer films including a second outer layer and a second tie layer disposed between the second outer layer and the base layer, wherein the second tie layer comprises a foamed polyolefin-based adhesive composition. Other embodiments include various combinations of additional layers, some with only additional outer layers and some with both additional outer layers and tie layers. Tie layers have highest value as a connection between two other layers that are dissimilar or incompatible with one another.

The present disclosure further provides a process for forming a multilayer structure. Polymer compositions that will form each layer of a multilayer structure are prepared by heating and mixing the polymer compositions in a melted state, such as in an extruder. The polymer composition of each layer can be a single polymer or a blend of different polymer, and in either case can optionally include one or more additives. An extruder barrel and screw promote a uniform and consistent temperature of the polymer melt being prepared as well as ensuring thorough mixing of separate components and/or additives.

In the extruder, the polymer composition of the tie layer comprises a polyolefin-based adhesive composition containing dissolved gas. In some embodiments, the dissolved gas is formed by the addition of a chemical foaming agent to the polyolefin-based adhesive composition. Pressure and temperature conditions maintained in the extruder sufficient both to cause thermal decomposition of the chemical foaming agent and to keep the gas resulting from this thermal decomposition dissolved in the melted polyolefin-based adhesive composition. In other embodiments, the dissolved gas is formed by the addition of gas directly to the melted polyolefin-based adhesive composition, such as by injection into the extruder barrel from a separate source. Pressure and temperature conditions are maintained in the extruder sufficient both to promote mixing and distribution of the added gas throughout the melted polyolefin-based adhesive composition and to keep the gas dissolved in the melted polyolefin-based adhesive composition.

Polymer compositions that will form each layer of the multilayer film are coextruded to form a multilayer melt of polymer compositions, including at least a base layer, a first outer layer, and a tie layer disposed between and coextensively adherent to both the base layer and the first outer layer. During the coextrusion, with respect to the tie layer, when the tie-layer polymer composition is discharged from the extruder through the die, the reduced pressure on the melted polyolefin-based adhesive composition containing dissolved gas causes the polymer composition of the tie layer to foam. This foaming is the result of dissolved gas in the melted polyolefin-based adhesive composition coming out of solution to form a dispersed phase of gas cells in a melted polymer matrix.

The multilayer melt formed after coextrusion is cooled at a controlled rate to induce collapse of at least a portion of the gas cells in the tie layer to solidification. In some embodiments, cooling rate is controlled such that most or even substantially all gas cells are allowed to collapse. The desired amount of collapse of the gas cells, and in turn the desired cooling rate, can be determined through observation of the opacity or clarity of the multilayer melt prior to solidification and/or the final multilayer film.

The foregoing has outlined rather broadly the features and technical advantages of the present invention in order that the detailed description of the invention that follows may be better understood. Additional features and advantages of the invention will be described hereinafter, which form the subject matter of the claims of the invention. It should be appreciated by those skilled in the art that the conception and specific embodiments disclosed may be readily utilized as a basis for modifying or designing other film structures and/or processes for carrying out the same purposes of the present invention. It should also be realized by those skilled in the art that such equivalent constructions do not depart from the spirit and scope of the invention as set forth in the appended claims. The novel features which are believed to be characteristic of the invention, both as to its structure and method of manufacture, together with further objects and advantages will be better understood from the following description.

DETAILED DESCRIPTION OF THE INVENTION

Illustrative embodiments of the subject matter claimed below will now be disclosed. In the interest of clarity, some features of some actual implementations may not be described in this specification. It will be appreciated that in the development of any such actual embodiments, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

"Barrier layer," as used herein, means a layer used in a multilayer film to impart gas impermeability in addition to other desired properties to a multilayer structure.

"Multilayer film," as used herein, means a coextruded structure comprising at least a barrier layer, a structural layer, and a tie layer.

"Nonpolar comonomer," as used herein, means a monomer unit containing only carbon and hydrogen.

"Nonpolar polymer," as used herein, means a polymer or copolymer consisting of units derived from a nonpolar monomers.

"Polar monomer," as used herein, means monomers containing highly electronegative atoms, such as chlorine, fluorine, oxygen, nitrogen, or sulfur, that give rise to polymers that contain permanent electric dipoles.

"Polar polymer," as used herein, means a polymer or copolymer comprising units derived from a polar monomers.

"Polyolefin-based adhesive composition," as used herein, means any composition comprising a functionalized polymer, alone or in combination with other polymers, where, in the context of coextruded layers of polymers, a layer of the polyolefin-based adhesive composition (or "tie layer") will adhere better to both a first polymer layer and a second polymer layer than the first polymer layer and the second polymer layer would adhere to each other. Examples of polyolefin-based adhesive compositions are disclosed in U.S. Patent Publication Nos. 2017/0198103 and 2017/0335149, and U.S. Pat. Nos. 7,687,575, 7,871,709, 8,598,264, 8,673,451, 8,685,539, 9,499,723, 9,650,548, 9,662,864, 9,676,971, 9,803,074, 10,053,574, 10,150,894, 10,240,072, and 10,266,727, all of which, the contents are incorporated by reference herein in their entirety. Tie layers can also improve adhesion as described above where one or both polymer layers are replaced by a nonpolymeric layer.

"Structural layer," as used herein, means a layer used in a multilayer film to impart desired mechanical properties and/or resistance to moisture to the multilayer structure.

Multilayer Film

Wraps for meat and cheese, snack foods, baking mixes, and large bulk packaging for perishables, such as dog food, require multilayer structures to prevent transmission of oxygen and/or moisture. EVOH and nylons have high clarity with excellent flex-crack resistance, and also some of the best barrier properties to gases such as oxygen, nitrogen, and carbon dioxide making it especially suited for packaging of food, drugs, cosmetics, and other perishable or delicate products to extend shelf life. In comparison with many other common films, polar polymers such as EVOH and nylon have superior barrier properties. However, the good gas barrier properties of many polar polymers, such as EVOH and nylon, deteriorate when exposed to moisture.

Nonpolar polymers, such as polyethylene and polypropylene, have superior moisture resistance properties. For this reason and to optimize both cost and performance, layers of polar polymers and nonpolar polymers, like HDPE, PP, and PET, which have superior moisture barrier properties, are frequently used in combination in multilayer, co-extruded films. However, polar and nonpolar polymers do not adhere well to one another, thus requiring the use of adhesive compositions as tie layers between the layers of dissimilar polymers.

Adhesive compositions suitable for use as tie layers for multilayer constructions have good adhesion to both polar polymers and nonpolar polymers. Exemplary polar polymers include, but are not limited to acrylonitrile butadiene styrene, ethylene vinyl acetate, EVOH, ethylene n-butyl acetate, ethylene methyl acrylate copolymer, ethylene acrylic acid copolymer, nylon, polycarbonate, and polymethylmethacrylate. Exemplary nonpolar polymers include, but are not limited to polyethylene homopolymers, ethylene α-olefin copolymers, polypropylene homopolymers, propylene α-olefin copolymers, and polyolefins generally.

In some embodiments, the multilayer structure comprises:
(A) a first polyolefin layer;
(B) a first polar polymer layer; and
(C) at least one tie layer between the polyolefin layer and the polar polymer layer.

The general process for forming the multilayer structure includes co-extruding the layers to form a multilayer structure. The multilayer structures can be in the form of films or sheets, which may be further thermoformed or oriented, and can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die.

Outer Layer

In some embodiments, one or more outer layers are structural layers that are typically nonpolar polymers or copolymers. In some embodiments, structural layers can be coextruded adjacent to another structural layer, and adjacent layers can be the same or different materials. In some embodiments, a structural layer is a blend of two or more polyolefins such as, but not limited to, a blend of low density polyethylene (LDPE) and linear low density polyethylene (LLDPE).

Suitable polyethylenes for structural layers include ethylene homopolymers and copolymers of units derived from ethylene and units derived from one or more of $C_3$-$C_8$ α-olefins or mixtures thereof. Preferably, the units derived from the one or more $C_3$-$C_8$ α-olefin comonomers are present in amounts up to 15 wt. %, based upon the total weight of the copolymer of ethylene. The ethylene homopolymers and copolymers can be produced using either Ziegler Natta or single-site catalysts, e.g., metallocene catalysts. The ethylene homopolymers and copolymers can be produced using a gas phase process, high pressure process, slurry process, or solution process. Ethylene homopolymers and ethylene-$C_3$-$C_8$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm$^3$, as measured by ASTM D-1505 "Column Method." LDPE and LLDPE are defined as having densities in the range of from 0.910 to 0.930 g/cm$^3$. MDPE is defined as having a density of 0.930 to 0.945 g/cm$^3$. HDPE is defined as having a density of at least 0.945 g/cm$^3$, preferably from 0.945 to 0.969 g/cm$^3$. The ethylene homopolymers and copolymers preferably have melt indexes (MIs), as measured by ASTM D 1238, condition 190° C./2.16 kg, from 0.01 to 400 dg/min, preferably, from 0.1 to 200 dg/min., more preferably from 1 to 100 dg/min.

Suitable polypropylenes for structural layers include a propylene homopolymers and copolymers of units derived from propylene and units derived one or more of ethylene and $C_4$-$C_{10}$ α-olefins or mixtures thereof. Preferably, the units derived from one or more of ethylene and $C_4$-$C_{10}$ α-olefin comonomers are present in amounts up to 35 wt. %, based upon the total weight of the copolymer of propylene. The propylene homopolymers and copolymers can be produced using either Ziegler Natta or single-site catalysts, e.g., metallocene catalysts. The propylene homopolymers and copolymers can be produced using a gas phase process, slurry process, or solution process. In some embodiments, when the propylene polymer is a copolymer, it preferably contains 2 to 6 wt. %, based upon the total weight of the copolymer, of ethylene derived units as a comonomer.

A structure layer can also by formed from a blend of two or more polyethylenes, two or more polypropylenes, or one or more polyethylenes and one or more polypropylenes.

In some embodiments, a preferred composition of an outer layer is LLDPE as described above, LDPE as described above, or a combination thereof.

Base Layer

In some embodiments, the multilayer structure includes at least one barrier layer as a base layer. A barrier layer may include EVOH, nylons, such as nylon 6, nylon 6,6, nylon 12, nylon 6,12, nylon 6,66, and blends thereof, as well as co-extruded structures of EVOH and nylons, such as EVOH/nylon and nylon/EVOH/nylon. Barrier layers also include polyvinylidene chloride (PVDC) and polychlorotrifluoroethylene (PCTFE). Preferably, the barrier layers are selected from EVOH, nylons or co-extruded structures thereof. More preferably, the barrier layer is EVOH.

Tie Layer

In preferred embodiments, the foamed tie layer in the multilayer films disclosed herein improves the adherence between a base layer, such as a polar polymer barrier layer, and an outer layer of a dissimilar structural layer, such as a polyolefin layer, as compared to coextrusion of the same base layer and outer layer with a tie layer of the same material that has not been foamed. The foamed tie layers disclosed herein additionally provide a new and useful combination of properties by improving one or more properties of the multilayer structure, including toughness and/or optical properties, as compared to comparable films where the tie layer is not foamed. Improved toughness of multilayer films with foamed tie layers is exhibited by higher values in dart drop impact (ASTM D-1709). Improved optical properties of multilayer films with foamed tie layers are exhibited by higher clarity (ASTM D-1746) and/or lower haze (ASTM D-1003).

Foamed tie layers herein comprise a polyolefin-based adhesive composition as a starting material. Foaming of the tie layer is accomplished by adding the polyolefin-based adhesive composition and a gas to an extruder and applying pressure and temperature conditions in the extruder sufficient to form a mixture of melted polyolefin-based adhesive composition and dissolved gas. When the mixture is discharged from the extruder through the die, the reduced pressure on the mixture causes the gas to come out of solution resulting in a matrix of melted polyolefin-based adhesive composition having a dispersed phase of gas cells or bubbles.

Discharge of the polyolefin-based adhesive composition melt from the extruder die also stops the addition of heat to the composition caused by specific energy input, either by shaft work or thermal input in the extruder. In many polymer foaming processes, the goal is to retain the dispersed phase of gas cells or bubbles in the final product after the polymer melt is cooled to a solid state at room temperature. In contrast, the gas cells or bubbles in the foamed polyolefin-based adhesive composition herein are partially or substantially fully collapsed prior to solidification, such that when the polyolefin-based adhesive composition melt is cooled to a solid state at room temperature, or an even a lower temperature by external chilling apparatus, the extrudate is more homogeneous and more fully annealed.

The desired collapse of the dispersed phase of gas cells is obtained by controlling the rate at which the extrudate cools to induce a higher enthalpy state in the tie-layer matrix than the enthalpy state of an extrudate that is cooled at a faster rate. Without wishing to be bound by any theory, it is believed that the higher enthalpy is accomplished by more complete relaxation of the polymer chains, which results in a higher level of crystallinity or solidification in the foamed polyolefin-based adhesive composition.

Foaming Agents

In some embodiments, the addition of gas to the extruder is accomplished by adding a chemical foaming agent to the polyolefin-based adhesive composition in the extruder. The chemical foaming agent can be added to the extruder by compounding with the polyolefin-based adhesive composition in a separate extrusion process resulting in a pelletized mixture of the polyolefin-based adhesive composition and the foaming agent. This separate extrusion process is carried out at a temperature below the thermal decomposition temperature of the foaming agent. This pelletized mixture is fed to the extruder directed to producing the foamed tie layer where it is subjected to pressure and temperature conditions, with the mixing action of the extruder screw and barrel, sufficient to cause decomposition of the foaming agent resulting in generation of gas and to produce a mixture of melted polyolefin-based adhesive composition and dissolved gas, wherein the gas is the gas generated by decomposition of the foaming agent. Foaming agents can be used alone or with nucleating agents to promote more uniform bubble distribution.

Suitable chemical foaming agents include azo foaming agents, nitroso foaming agents, azide foaming agents, bicarbonate foaming agents, and combinations thereof. Examples of azo foaming agents include azobiscarbonamide, azobiscarboxamide, azobisisobutyronitrile, azobiscyclohexylnitrile, azocyclohexylnitrile, azodiaminobenzene, azodicarbonamide, azodiformamide, barium azodicarboxylate, diazenedicarbonic, diazenedicarboxamide, diazoaminobenzene, and the like. Examples of nitroso foaming agents include trinitrosotrimethylenetriamine, N,N'-dimethyl-N,N'-dinitroso-telephthalamide, N,N'-dinitroso-pentamethylenetetramine, and the like. Examples of the azide foaming agents include 4,4'-oxybis(benzenesulfonyl hydrazide), p-toluenesulfonyl hydrazide, benzenesulfonyl hydrazide, toluenesulfonyl hydrazide, diphenylsulfone-3,3'-disulfonyl hydrazide, calcium azide, 4,4'-diphenyl-disulfonyl azide, p-toluenesulfonyl azide, p-toluenesulfonyl acetonehydrazone, 4,4'-oxybenzenesulfonyl hydrazide, and the like. Examples of the bicarbonates include sodium hydrogen carbonate, sodium carbonate, sodium bicarbonate, ammonium hydrogen carbonate, ammonium carbonate, ammonium bicarbonate, ammonium nitrite, and the like. In some embodiments, nitroso foaming agents and/or azo foaming agents are preferable. A single chemical foaming agent can be used or a combination of two or more types of chemical foaming agents can be used.

In some embodiments, physical foaming is used instead of chemical foaming. In physical foaming, a gas is injected directly into the polymer melt in the extruder barrel. Additional equipment is needed to inject gas with high pressure into the melt. In physical foaming, such as the MuCell™ process, a precise amount of gas directly into the extruder barrel each regardless of process temperature. Therefore, physical foaming is suitable for all process temperatures, while a wide range of chemical foaming agents available on the market have reaction temperatures in the range of from 160° C. to 200° C.

The gas generated in the chemical foaming process or used in the physical foaming process is typically nitrogen, carbon-dioxide, or a mixture thereof. However, any gas having suitable solubility in the polymer melt can be used.

Nucleating Agent

Nucleating agent, in the context of use in combination with the foaming agent, means a substance, typically a small particle, that provides a nucleation site or location for bubble formation within a polymer melt, the tie layer in this case. Nucleating agents are used to enhance the cell structure of foamed polymers. Some nucleating agents are "active" in that such compounds both act as a nucleating agent and participates in blowing by at least partially decomposing to yield gaseous components.

Examples of nucleating agents suitable for use with this invention include inorganic and organic nucleating agents. Inorganic nucleating agents can include talcum, metal oxides, such as titanium dioxide or magnesium oxide, phosphates, carbonates or sulfates of alkaline earth metals, clay and nano-clays, carbon and nano-carbons, pigments having a suitable particle size, or mixtures thereof. Organic nucleating agents can include polymers having a higher melting temperature than the polyolefin-based adhesive composition, and terephthalic acid, a mono- or polycarboxylic acids, and the salts thereof, e.g., 4-tert-butylbenzoic acid, adipic acid, diphenylacetic acid, sodium succinate, sodium benzoate, or mixtures thereof, but other nucleating agents may also be used.

The amount of nucleating agent added may vary depending on the nature of the nucleating agent selected. The nucleating agent will usually be present in an amount ranging from 0.05 to 15.0 wt. % with respect to the amount of thermoplastic polymer, more preferably 0.5 to 10.0 wt. %, most preferably between 0.5 and 8 wt. %, in particular between 2.0 and 8.0 wt. % relative to the weight of the thermoplastic polymer.

Polyolefin-Based Adhesive Composition

In some embodiments, the polyolefin-based adhesive composition is formed by melt blending a polyolefin with a functionalized olefin-based polymer. In one or more embodiments, the polyolefin contacts the functionalized olefin-based polymer prior to pelletization. In one or more other embodiments, functionalized the olefin-based polymer contacts the polyolefin prior to pelletization.

In other embodiments, regardless of the blending the polyolefin and the functionalized olefin-based polymer, the process of combining the two components further includes melt blending the polyolefin polymer and the functionalized olefin-based in the presence of adhesion promoting additive.

In some embodiments, the polyolefin-based adhesive composition includes the functionalized olefin-based polymer in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, or 12 wt. % to 17 wt. %, based on the total weight of the polyolefin-based adhesive composition.

In some embodiments, a preferred composition of the polyolefin-based adhesive composition comprises a blend of LLDPE having a density in the range of from 0.910 to 0.930 g/cm$^3$ with a HDPE having a density of at least 0.945 g/cm$^3$, preferably from 0.945 to 0.969 g/cm$^3$, the HDPE having been functionalized with maleic anhydride (HDPE-g-MAH). In some preferred embodiments, the HDPE-g-MAH is present in the blend of LLDPE and HDPE-g-MAH in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, based on the total weight of the polyolefin-based adhesive composition.

In other embodiments, a preferred composition of the polyolefin-based adhesive composition comprises a blend of LLDPE having a density in the range of from 0.910 to 0.930 g/cm$^3$ with another LLDPE having a density of 0.910 to 0.930 g/cm$^3$, the LLDPE having been functionalized with maleic anhydride (LLDPE-g-MAH). In some preferred embodiments, the LLDPE-g-MAH is present in the blend of LLDPE and LLDPE-g-MAH in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, based on the total weight of the polyolefin-based adhesive composition.

Polyolefin Component of the Polyolefin-Based Adhesive Composition

The composition of the polyolefin component of the polyolefin-based adhesive composition can comprise a single ethylene-based polymer, a single propylene-based polymer, a blend of two or more ethylene-based polymers, a blend of two or more propylene-based polymers, or a blend of at least one ethylene-based polymer and at least one propylene-based polymer. Suitable ethylene-based polymers and propylene-based polymers are described below. The one or more polymers selected from ethylene-based polymers, propylene-based polymers, and combinations thereof chosen for the composition of the polyolefin can be the same as or different from those selected for the composition of the olefin-based polymer component of the functionalized olefin-based polymer.

Suitable polyethylenes for use as the polyolefin component of the polyolefin-based adhesive include ethylene homopolymers and copolymers of units derived from ethylene and units derived from one or more of $C_3$-$C_8$ α-olefins or mixtures thereof. Preferably, the units derived from the one or more $C_3$-$C_8$ α-olefin comonomers are present in amounts up to 15 wt. %, based upon the total weight of the copolymer of ethylene. The ethylene homopolymers and copolymers can be produced using either Ziegler Natta or single-site catalysts, e.g., metallocene catalysts. The ethylene homopolymers and copolymers can be produced using a gas phase process, high pressure process, slurry process, or solution process. Ethylene homopolymers and ethylene-$C_3$-$C_8$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm$^3$, as measured by ASTM D-1505 "Column Method." LDPE and LLDPE are defined as having densities in the range of from 0.910 to 0.930 g/cm$^3$. MDPE is defined as having a density of 0.930 to 0.945 g/cm$^3$. HDPE is defined as having a density of at least 0.945 g/cm$^3$, preferably from 0.945 to 0.969 g/cm$^3$. The ethylene homopolymers and copolymers preferably have melt indexes (MIs), as measured by ASTM D 1238, condition 190° C./2.16 kg, from 0.01 to 400 dg/min, preferably, from 0.1 to 200 dg/min., more preferably from 1 to 100 dg/min.

Suitable polypropylenes for use as the polyolefin component of the polyolefin-based adhesive include a propylene homopolymers and copolymers of units derived from propylene and units derived one or more of ethylene and $C_4$-$C_{10}$ α-olefins or mixtures thereof. Preferably, the units derived from one or more of ethylene and $C_4$-$C_{10}$ α-olefin comonomers are present in amounts up to 35 wt. %, based upon the total weight of the copolymer of propylene. The propylene homopolymers and copolymers can be produced using either Ziegler Natta or single-site catalysts, e.g., metallocene catalysts. The propylene homopolymers and copolymers can be produced using a gas phase process, slurry process, or solution process. In some embodiments, when the propylene polymer is a copolymer, it preferably contains 2 to 6 wt. %, based upon the total weight of the copolymer, of ethylene derived units as a comonomer.

In some embodiments, a preferred composition of the polyolefin component of the polyolefin-based adhesive composition is a polyethylene, as described above. In some embodiments, a preferred composition of the polyolefin component of the polyolefin-based adhesive composition is a LLDPE having a density in the range of from 0.910 to 0.930 g/cm$^3$.

Functionalized Olefin-Based Polymer Component of the Polyolefin-Based Adhesive Composition Functionalized olefin-based polymers are generally formed by grafting a functional monomer onto the backbone (i.e., main chain) of an olefin-based polymer. The composition of the olefin-based polymer can comprise a single ethylene-based polymer, a single propylene-based polymer, a blend of two or more ethylene-based polymers, a blend of two or more propylene-based polymers, or a blend of at least one ethylene-based polymer and at least one propylene-based polymer. Suitable ethylene-based polymers and propylene-based polymers are described below. The one or more polymers selected from ethylene-based polymers, propylene-based polymers, and combinations thereof selected for the composition of the olefin-base polymer can be the same as or different from those chosen for the composition of the polyolefin.

The functional monomer can be grafted onto the olefin-based polymer via processes known to one skilled in the art. For example, the graft may be formed via reactive extrusion processes. Reactive extrusion processes generally include contacting the olefin-based polymer with the functional monomer within an extruder or in a solution process to form the functionalized olefin-based polymer.

The reactive extrusion processes may include any extrusion process known in the art. For example, raw materials (e.g., olefin based polymer and functional monomer) may be fed into a twin screw extruder in a concentration sufficient to form the functionalized olefin-based polymer having a target graft content. The reaction to form the functionalized olefin-based polymer may occur in the twin screw extruder under constant mixing and kneading, for example. Thus, the functionalized olefin-based polymer generally includes a linear backbone of the first olefin-based polymer with randomly distributed branches of the functional monomer, resulting in side chains that are structurally distinct from the main chain/backbone.

In one or more embodiments, the olefin-based polymer contacts the functional monomer in the presence of an initiator. Initiators can be selected from those known to one skilled in the art, such as, but not limited to, organic peroxides. However, as discussed previously herein, grafting can take place under high temperature and high shear in absence of an initiator.

The functionalized olefin-based polymer may include the functional monomer in a range of from 0.001 wt. % to 100 wt. %, or 0.01 wt. % to 15 wt. %, or 0.01 wt. % to 5 wt. %, or 0.1 wt. % to 3 wt. %, based on the total weight of the functionalized olefin-based polymer, for example.

In one or more embodiments, the functionalized polyolefin may exhibit a grafting yield in a range of from 0.2 wt. % to 20 wt. %, or 0.5 wt. % to 10 wt. % or 1 wt. % to 5 wt. %, for example. The grafting yield may be determined by Fourier Transform Infrared Spectroscopy (FTIR).

In some embodiments, a preferred composition of the functionalized olefin-based polymers is a HDPE having a density of at least 0.945 g/cm$^3$, preferably from 0.945 to 0.969 g/cm$^3$, which has been functionalized, as described above with maleic anhydride.

In other embodiments, a preferred composition of the functionalized olefin-based polymers is a LLDPE having a density of range of from 0.910 to 0.930 g/cm$^3$, which has been functionalized, as described above with maleic anhydride.

Functional Monomer Component of the Functionalized Olefin-Based Polymer

The functional monomer may include carboxylic acids and carboxylic acid derivatives, such as acrylic acid, maleic acid, fumaric acid, citraconic acid, mesaconic acid, maleic anhydride, 4-methyl cyclohex-4-ene-1,2-dicarboxylic acid or anhydride, bicyclo(2,2,2)oct-5-ene-2,3-dicarboxylic acid or anhydride, bicyclo(2,2,1)hept-5-ene-2,3-dicarboxylic acid or anhydride, tetrahydrophthalic acid or anhydride, methylbicyclo(2,2,1)hept-5-ene-2,3-dicarboxylic acid or anhydride, x-methylnorborn-5-ene-2,3 dicarboxylic acid and anhydride, norborn-5-ene-2,3, dicarboxylic acid and anhydride, maleo-pimaric acid, 1,2,3,4,5,8,9,10-octahydronaphthalene-2,3-dicarboxyic acid and anhydride, 2-oxa-1,3-diketospiro(4,4)non-7-ene, nadic anhydride and anhydride, methyl nadic anhydride, himic anhydride, methyl himic anhydride and combinations thereof, for example. Alternatively, the functional monomer may include acid and acid anhydride derivatives, such as dialkyl maleates, dialkyl fumarates, dialkyl itaconates, dialkyl mesaconates, dialkyl citraconates, alkyl crotonates and combinations thereof, for example.

In some embodiments, a preferred functional monomer is maleic anhydride.

Olefin-Based Polymer Component of the Functionalized Olefin-Based Polymer

The composition of the olefin-based polymer component of the functionalized olefin-based polymer can comprise a single ethylene-based polymer, a single propylene-based polymer, a blend of two or more ethylene-based polymers, a blend of two or more propylene-based polymers, or a blend of at least one ethylene-based polymer and at least one propylene-based polymer. Suitable ethylene-based polymers and propylene-based polymers are described below.

Suitable polyethylenes for use as the olefin-based polymer component of the functionalized olefin-based polymer include ethylene homopolymers and copolymers of units derived from ethylene and units derived from one or more of $C_3$-$C_8$ α-olefins or mixtures thereof. Preferably, the units derived from the one or more $C_3$-$C_8$ α-olefin comonomers are present in amounts up to 15 wt. %, based upon the total weight of the copolymer of ethylene. The ethylene homopolymers and copolymers can be produced using either Ziegler Natta or single-site catalysts, e.g., metallocene catalysts. The ethylene homopolymers and copolymers can be produced using a gas phase process, high pressure process, slurry process, or solution process. Ethylene homopolymers and ethylene-$C_3$-$C_8$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm$^3$, as measured by ASTM D-1505 "Column Method." LDPE and LLDPE are defined as having densities in the range of from 0.910 to 0.930 g/cm$^3$. MDPE is defined as having a density of 0.930 to 0.945 g/cm$^3$. HDPE is defined as having a density of at least 0.945 g/cm³, preferably from 0.945 to 0.969 g/cm³. The ethylene homopolymers and copolymers preferably have melt indexes (MIs), as measured by ASTM D 1238, condition 190° C./2.16 kg, from 0.01 to 400 dg/min, preferably, from 0.1 to 200 dg/min., more preferably from 1 to 100 dg/min.

Suitable polypropylenes for use as the olefin-based polymer component of the functionalized olefin-based polymer include a propylene homopolymers and copolymers of units derived from propylene and units derived one or more of ethylene and $C_4$-$C_{10}$ α-olefins or mixtures thereof. Preferably, the units derived from one or more of ethylene and $C_4$-$C_{10}$ α-olefin comonomers are present in amounts up to 35 wt. %, based upon the total weight of the copolymer of propylene. The propylene homopolymers and copolymers can be produced using either Ziegler Natta or single-site catalysts, e.g., metallocene catalysts. The propylene homopolymers and copolymers can be produced using a gas phase process, slurry process, or solution process. In some embodiments, when the propylene polymer is a copolymer, it preferably contains 2 to 6 wt. %, based upon the total weight of the copolymer, of ethylene derived units as a comonomer.

Certain Embodiments

In some embodiments, the multilayer film comprises:
(A) One or more outer layers comprising LLDPE having a density in the range of from 0.910 to 0.930 g/cm³, LDPE having a density in the range of from 0.910 to 0.930 g/cm³, or a combination thereof;
(B) One or more base layers comprising EVOH; and
(C) One or more tie layers, each tie layer disposed between a base layer and an outer layer, each tie layer comprising a blend of LLDPE having a density in the range of from 0.910 to 0.930 g/cm³ with a HDPE having a density of at least 0.945 g/cm³, preferably from 0.945 to 0.969 g/cm³, the HDPE having been functionalized with maleic anhydride (HDPE-g-MAH), wherein the HDPE-g-MAH is present in the blend of LLDPE and HDPE-g-MAH in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, based on the total weight of the polyolefin-based adhesive composition.

In other embodiments, the multilayer film comprises:
(A) One or more outer or base layers consisting essentially of LLDPE having a density in the range of from 0.910 to 0.930 g/cm³, LDPE having a density in the range of from 0.910 to 0.930 g/cm³, or a combination thereof;
(B) One or more base layers consisting essentially of EVOH; and
(C) One or more tie layers, each tie layer disposed between a base layer and an outer layer, the tie layer consisting essentially of a blend of LLDPE having a density in the range of from 0.910 to 0.930 g/cm³ with a HDPE having a density of at least 0.945 g/cm³, preferably from 0.945 to 0.969 g/cm³, the HDPE having been functionalized with maleic anhydride (HDPE-g-MAH), wherein the HDPE-g-MAH is present in the blend of LLDPE and HDPE-g-MAH in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, based on the total weight of the polyolefin-based adhesive composition.

In yet other embodiments, the multilayer film comprises:
(A) One or more outer layers comprising LLDPE having a density in the range of from 0.910 to 0.930 g/cm³, LDPE having a density in the range of from 0.910 to 0.930 g/cm³, or a combination thereof;
(B) One or more base layers comprising EVOH; and
(C) One or more tie layers, each tie layer disposed between a base layer and an outer layer, each tie layer comprising a blend of LLDPE having a density in the range of from 0.910 to 0.930 g/cm³ with another LLDPE having a density in the range of from 0.910 to 0.930 g/cm³, the LLDPE having been functionalized with maleic anhydride (LLDPE-g-MAH), wherein the LLDPE-g-MAH is present in the blend of LLDPE and LLDPE-g-MAH in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, based on the total weight of the polyolefin-based adhesive composition.

In yet other embodiments, the multilayer film comprises:
(A) One or more outer or base layers consisting essentially of LLDPE having a density in the range of from 0.910 to 0.930 g/cm³, LDPE having a density in the range of from 0.910 to 0.930 g/cm³, or a combination thereof;
(B) One or more base layers consisting essentially of EVOH; and
(C) One or more tie layers, each tie layer disposed between a base layer and an outer layer, the tie layer consisting essentially of a blend of LLDPE having a density in the range of from 0.910 to 0.930 g/cm³ with another LLDPE having a density in the range of from 0.910 to 0.930 g/cm³, the LLDPE having been functionalized with maleic anhydride (LLDPE-g-MAH), wherein the LLDPE-g-MAH is present in the blend of LLDPE and LLDPE-g-MAH in a range of from 0.5 wt. % to 30 wt. %, or 1 wt. % to 20 wt. %, or 2 wt. % to 15 wt. %, or 5 wt. % to 15 wt. %, or 6 wt. % to 11 wt. %, based on the total weight of the polyolefin-based adhesive composition.

Additives

The tie-layer compositions and/or other layers of the multilayer film can further comprise additives such as stabilizers, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, flow-control agents, optical brighteners, flame-proofing agents, antistatic agents, blowing agents, and mixtures thereof. In some embodiments, the tie-layer composition may include 0.001 to 2 wt. %, based upon the total weight of the tie-layer composition, of a primary additive. In some examples, the primary additive is an antioxidant. In some embodiments, the tie-layer composition may include 0.001 to 2 wt. %, based upon the total weight of the tie-layer composition, of a secondary additive. In some examples, the secondary additive is an antioxidant. In specific embodiments, the primary additive and/or the secondary additive may be a processing stabilizer, and/or a sterically hindered phenolic primary antioxidant. In specific embodiments, the tie-layer composition includes 0.1 wt. %, based upon the total weight of the tie-layer composition, of a sterically hindered phenolic antioxidant. The sterically hindered phenolic antioxidant may be tetrakis [methylene(3,5-di-(tert)-butyl-4-hydroxyhydrocinnamate)]methane. In specific embodiments, the tie-layer composition includes 0.1 wt. %, based upon the total weight of the tie-layer composition, of a hydrolytically stable phosphite processing stabilizer. The hydrolytically stable phosphite processing stabilizer may be tris(2,4-ditert-butylphenyl)phosphite.

Forming a Multilayer Film

Methods for making a multilayer films using extrusion processes are also provided herein.

In some embodiments, multilayer structures herein include those made by coextrusion of at least three polymer layers where the middle layer is a foamed tie layer as described herein. Multilayer films having at least three polymer layers can be produced using a blown film process or a cast film process.

In other embodiments, multilayer structures herein include those made by coextrusion coating of at least one nonpolymeric layer with two polymer layers where the foamed tie layer described herein is disposed between the nonpolymeric layer and the other polymer layer. Nonpolymeric substrates include, but are not limited to, metallic foils and papers.

In yet other embodiments, multilayer structures herein include those made by extrusion lamination of at least two nonpolymeric layers where the foamed tie layer described herein is disposed between the two nonpolymeric layers. Nonpolymeric substrates include, but are not limited to, metallic foils and papers.

Blown Film Process

In a preferred blown film process, at least three layers are coextruded to produce a layer configuration AB/C, where A comprises a polar polymer, B comprises a polyolefin-based adhesive composition as a tie layer, and C comprises a nonpolar polymer.

In a multilayer coextrusion blown film process, polymers for each layer are heated in separate extruders. When melted polymers reach the end of the barrel of each extruder, the polymers are coextruded through a multilayer annular die. Melted polymer enters the die head and air is injected via a hole in the die center to radially inflate the polymer into a thin tube that is many times its original, extruded diameter. The hot film tube is then cooled and pulled upward by nip rollers, which flatten the tube and trap air inside to tube.

The multilayer melt begins to cool as soon as it exits the die. As the film cools it solidifies at what is called the frost line, which forms a visible line around the circumference of the polymer tube at a certain height above the die, the frost line height (FLH). During production of a multilayer blown film having one or more foamed tie layers as described herein, one can visually observe that the multilayer melt becomes opaque or very cloudy as it exits the die due to the dispersed phase of gas cells or bubbles formed in the matrix of melted polyolefin-based adhesive composition. The bubbles in the dispersed phase begin to collapse soon after formation and will continue to collapse so long as the tie layer remains in the melted state. As the bubbles collapse in the tie layer, the clarity of the multilayer film increases as it becomes less opaque. Preferably, prior to reaching the frost line, the multilayer melt reaches substantially the same clarity as a multilayer melt of the same layers and layer compositions at the same conditions but where the tie layer has not been being foamed. Collapse of the dispersed gas phase will stop at the FLH, where the multilayer melt solidifies. Therefore, it is desirable for the dispersed phase of bubbles to be substantially or fully collapsed in the tube of the multilayer melt at a distance from the extruder die less than the FLH. Substantial or full collapse of the dispersed phase of bubbles in the tie-layer melt is indicated by visual observation of the multilayer melt becoming as clear possible or approaching the clarity of its multilayer analog, with a tie layer that had not been foamed, before reaching the frost line, that is, at a distance from the die less than the FLH.

One skilled in the art will recognize the process variables related to rates, temperature, and heat transfer relevant to adjusting the FLH and be able to make the changes required to induce collapse of gas cells in the foamed tie layer prior to the extruded multilayer tube reaching the frost line. One skilled in the art would recognize the frost line location in the blown film coextrusion process is a function of heat transfer and linear velocity of the blown film tube and further would understand how to adapt these principals to successfully make appropriate adjustments for multilayer films having different layer arrangements and/or layer compositions. Directionally, where linear velocity of the blown film tube is held constant or substantially constant and heat transfer variables are adjusted, FLH or frost line distance from the extruder die is increased by increasing temperature of the multilayer melt, increasing velocity of air injected into the tube, increasing film thickness, and/or decreasing the temperature of the air injected into the tube. Directionally, where heat transfer variables are held constant or substantially constant, FLH or frost line distance from the extruder die is increased by increasing linear velocity of the blown film tube. Generally, the FLH can be increased by increasing the take-up speed, the extruder speed, and/or the temperature of the air injected at the die to inflate the tube. The take-up speed is the speed that the polymer tube is drawn upwards from the die. The extruder speed is the revolutions per minute at which the extruder screw is driven. Preferably, one skilled in the art would balance adjustments to these process variables to produce multilayer films having foamed tie layers as described herein in a manner that maintains or achieves other desired film characteristics of the final multilayer film.

In a preferred embodiment, a multilayer film can be formed by coextruding a multilayer melt of thermoplastic polymers. The layers include at least one barrier layer, at least one structural layer, and at least one tie layer between the barrier layer and the structural layer.

To form the multilayer film, a polyolefin-based adhesive composition and a gas are added to an extruder and mixed under pressure and temperature conditions sufficient to produce a mixture of melted polyolefin-based adhesive composition and dissolved gas. Concurrently, in separate extruders, portions of a first polymer and a second polymer are heated to a temperature sufficient to permit extrusion. The polyolefin-based adhesive, the first polymer, and the second polymer are then coextruded for form a multilayer melt. The temperature of the multilayer melt is then decreased at a controlled rate to induce collapse of at least a portion of the gas cells.

Preferably, the first polymer is a polar polymer and the second polymer is a nonpolar polymer. Preferably the polar polymer is an EVOH or a nylon. Preferably, the nonpolar polymer comprises a single ethylene-based polymer, a single propylene-based polymer, a blend of two or more ethylene-based polymers, a blend of two or more propylene-based polymers, or a blend of at least one ethylene-based polymer and at least one propylene-based polymer.

In some embodiments, the gas to be dissolved in the tie layer can be produced in the extruder by thermal decomposition of a chemical foaming agent, such as an azo foaming agent, a nitroso foaming agent, an azide foaming agent, a bicarbonate foaming agent, or combinations thereof. In other embodiments, the gas is added into the extruder from and external source.

Cast Film Process

In a preferred cast film coextrusion process, at least three polymer layers in are coextruded to produce a layer configuration AB/C, where A comprises a polar polymer, B comprises a polyolefin-based adhesive composition as a tie layer, and C comprises a nonpolar polymer.

In a multilayer coextrusion cast film process, polymers for each layer are heated in separate extruders. When melted polymers reach the end of the barrel of each extruder, the polymers are coextruded through a multilayer flat die system to adopt its final shape. After exiting the die, the multilayer melt enters a cooling unit where its temperature is lowered with a water-cooled chill roll to solidify the film.

During production of a multilayer cast film having one or more foamed tie layers as described herein, one can visually observe that the multilayer melt becomes opaque or very cloudy as it exits the die due to the dispersed phase of gas cells or bubbles formed in the matrix of melted polyolefin-based adhesive composition.

As described above for blown films, it is desirable to maximize the visually observed clarity of the multilayer melt prior to solidification. One skilled in the art would recognize operating conditions, such as melt temperature, film production rate, and extruder speed, and/or useful modifications to conventional cast film equipment, such as distance from the die to the chill roll and temperature of the chill roll, that would result in the desired maximization of collapse of the dispersed bubbles in the foamed tie layer.

Coextrusion Coating

In a preferred coextrusion coating process, at least two polymer layers and one nonpolymeric substrate are combined to result in a layer configuration A/B/C, where A comprises a polar polymer, a nonpolar polymer, or combination thereof, B comprises a polyolefin-based adhesive composition as a tie layer, and C comprises a nonpolymeric substrate.

In a coextrusion coating process, an extruder forces melted thermoplastic resin through a flat die onto a moving substrate. The resulting product is a permanently coated substrate.

As described above for blown films, it is desirable to maximize the visually observed clarity of the multilayer melt prior to solidification. One skilled in the art would recognize operating conditions, such as film production rate and extruder speed, and/or useful modifications to conventional coextrusion coating equipment, such as distance from the die to the substrate, temperature of the substrate, and/or means for limiting cooling of the multilayer melt between the die and the substrate, that would result in the desired maximization of collapse of the dispersed bubbles in the foamed tie layer.

Extrusion Lamination

In a preferred extrusion lamination process, at least one polymer layer and two nonpolymeric substrates are combined to result in a layer configuration A/B/C, where A comprises a nonpolymeric substrate, B comprises a polyolefin-based adhesive composition as a tie layer, and C comprises a nonpolymeric substrate (e.g. foil/tie layer/paper).

In an extrusion lamination process, an extruder forces melted thermoplastic resin through a flat die to act as a bonding layer between to substrates. The resulting product is permanently bonded layers of substrate.

As described above for blown films, it is desirable to maximize the visually observed clarity of the multilayer melt prior to solidification. One skilled in the art would recognize operating conditions, such as melt temperature, film production rate, and extruder speed, and/or useful modifications to conventional extrusion lamination equipment, such as distance from the die to the substrates, temperature of the substrates, and/or means for limiting cooling of the multilayer melt between the die and the substrates, that would result in the desired maximization of collapse of the dispersed bubbles in the foamed tie layer.

The following examples illustrate the invention; however, those skilled in the art will recognize numerous variations within the spirit of the invention and scope of the claims. To facilitate a better understanding of the present invention, the following examples of preferred embodiments are given. In no way should the following examples be read to limit, or to define, the scope of the invention.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following examples provide compositions that are useful as tie-layer adhesive compositions. The exemplary tie-layer adhesive compositions can be used to bond polar polymer layers, such as EVOH, to other polymer layers in multilayer structures. The polyolefin-based adhesive compositions, as disclosed herein, are particularly useful in bonding structural layers, such as ethylene-based and/or propylene-based homopolymers and copolymers with non-polar comonomers and/or blends thereof, to oxygen barrier layers such as EVOH or nylon or combinations thereof in coextruded barrier structures. The foamed tie-layer compositions as disclosed herein were investigated through controlling the temperature of the tie layer polymer composition in the extruder, during extrusion, and after extrusion.

Raw materials used herein are shown in Table 1, below.

TABLE 1

| Label | Composition | Type | MI/MFR (g/10 min) | Density (g/cc) | Available from: |
|---|---|---|---|---|---|
| P1 | Petrothene ™ LLDPE GA502024 | LLDPE | 2.0 | 0.918 | LyondellBasell Industries NV |
| P2 | Petrothene ™ LDPE NA345196 | LDPE | 1.8 | 0.921 | LyondellBasell Industries NV |

TABLE 1-continued

| Label | Composition | Type | MI/MFR (g/10 min) | Density (g/cc) | Available from: |
|---|---|---|---|---|---|
| P3 | Blend of 50 wt. % P1 and 50 wt. % P2 | LLDPE/LDPE blend | — | — | — |
| P5 | SoarnoL™ EVOH DC3203FB | EVOH | 3.2 | 1.19 | Soarus LLC |
| P6 | Plexar™ PX3236 | Plexar | 2.0 | 0.922 | LyondellBasell Industries NV |
| P7 | Petrothene™ LLDPE GA502019 | LLDPE | 2.0 | 0.918 | LyondellBasell Industries NV |
| P8 | PMG2372 | HDPE-g-MAH | 7 | NA | LyondellBasell |
| F1 | Celogen™ AZ-760A Azodicarbonamide Modified | Foaming agent | NA | NA | CelChem LLC |
| A1 | Irganox™ 1010 | Antioxidant | NA | NA | BASF SE |
| S1 | Irgafox™ 168 | Stabilizer | NA | NA | BASF SE |

Tie layer materials used herein are shown in Table 2, below. Components are shown as a weight percent of the total weight of the tie layer polymer. Tie layer compositions TLP1, TLP2, and TLP4 were prepared by compounding the formulations in an 18 mm Leistritz twin screw extruder at a temperature below 190° C. at a rate of 15 lb/hr and 700 rpm.

TABLE 2

| Component | TLP1 (wt. %)* | TLP2 (wt. %) | TLP3 (wt. %)* | TLP4 (wt. %) |
|---|---|---|---|---|
| P7 | 91.325 | 91.225 | — | 91.125 |
| P8 | 8.5 | 8.5 | — | 8.5 |
| P6 | — | — | 100 | — |
| A1 | 0.10 | 0.10 | — | 0.10 |
| S1 | 0.075 | 0.075 | — | 0.075 |
| F1 | 0 | 0.10 | — | 0.20 |

Test Methods

Dart drop (g): Measurements were made following ASTM D1709-04 (2016), using a dart drop height of 26 in (F50).

Haze (%): Film haze measurements were made following ASTM D1003.

Crystallinity, heat of fusion, crystallization temperature were measured with differential scanning calorimetry per ASTM D3418-03.

Narrow Angle Scatter: Film NAS measurements were made following ASTM D1746 (2015).

Densities are determined in accordance with ASTM D1505.

MI/MFR are determined in accordance with D1238 (condition 190° C./2.16 g).

Examples Generally

The interface between a tie layer and a layer of EVOH may limit the impact strength in multilayer films. In this invention, a novel technique to prepare blown multilayer film with foamed tie layers demonstrated improved performance of multilayer structures where dissimilar layers are bonded. A chemical foaming agent was compounded with a tie-layer resin at a temperature below its decomposition temperature. Multilayer polymer coextrusion herein consists basically of a system of multiple single screw extruders with a coextrusion feedblock, a sequence of layer multiplier elements, and an exit die. In the feedblock, the melt streams are merged as parallel layers.

Coextrusion of 3-mil blown films were made using a Dr. Collin™ blown film line. The line was comprised of seven 25:1 L/D single screw extruders, A/B/C/D/E/F/G, equipped with grooved feed zones. EVOH was fed in the extruder D as a base layer. Comparative and inventive tie-layer polymers were fed into extruders C and E. The same material was fed into the outer layer extruders A, B, F, and G, at the same time in order to make five-layer films in the configuration OL/TL/BL/TL/OL, where OL is Outer Layer, TL is Tie Layer, and BL is Base Layer. Relative thickness of each layer was 37/7/12/7/37 or 40/4/12/4/40, where each number represents the percentage of the total multilayer thickness for each layer, respectively. The screw diameters for each extruder in mm were 25/25/20/20/20/25/25, respectively. The annular die was 60 mm in diameter and used a dual lip air ring cooling system. The die lip gap was set at 2 mm and the blow-up ratio (BUR) was 2.5. The lay flat was about 23 to 24 cm. Frost line height was set at 5.5 inches.

In all examples below, OL Comp. is the composition of the two outer layers, BL Comp. is the composition of the base layer, and TL comp. is the composition of the two tie layers in each example. TL Cyl. 1, TL Cyl. 2, and TL Cyl. 3 temperatures are the approximate average temperatures the tie-layer material in first third, second third, and final third of the of the length of the extruder barrel as measured for each example. TL Adapter and TL Die temperatures are the approximate average temperature the tie-layer material in the adapter between the extruder barrel and the approximate average temperature of the tie-layer material in the die block as measured for each example.

Examples 1-12

Test conditions and film performance results for Examples 1-12 are shown in Table 3. Examples 1-12 were all layer thickness configuration 37/7/12/7/37. Outer layers and base layers are common in all examples in order to demonstrate the performance differences of the multilayer films resulting from different tie-layer composition.

Examples 1, 2, 7, and 8 all have a common lower temperature profile for the extruder. Examples 3, 4, 9, and 10 all have a common midrange temperature profile for the extruder. Examples 5, 6, 11, and 12 all have a common higher temperature profile for the extruder.

Examples 1, 3, and 5 use a tie layer of a commercial olefin-based adhesive composition without foaming agent, and Examples 2, 4, and 6 use the same composition prepared in the laboratory. Examples 7, 9, and 11 use a tie layer of a composition containing 1000 ppm of a foaming agent, and Examples 8, 10, and 12 use the same composition containing 2000 ppm of the same foaming agent.

Dart Drop

For examples performed with the lower extruder temperature profile, Examples 7 and 8, using foamed tie layers both demonstrated dart drop results of 258 g, while comparative Examples 1 and 2 had dart drop results of 174 g and 162 g, respectively. This shows an improvement of 48% even when comparing the lower value of the two films having a foamed tie layer to the higher performing of the two comparative examples.

For examples performed with the midrange extruder temperature profile, Examples 9 and 10, using foamed tie layers demonstrated dart drop results of 300 g and 255 g, respectively, while comparative Examples 3 and 4 had dart drop results of 198 g and 159 g, respectively. This shows an improvement of 29% even when comparing the lower value of the two films having a foamed tie layer to the higher performing of the two comparative examples.

For examples performed with the higher extruder temperature profile, Examples 11 and 12, using foamed tie layers demonstrated dart drop results of 327 g and 309 g, respectively, while comparative Examples 5 and 6 had dart drop results of 219 g and 171 g, respectively. This shows an improvement of 41% even when comparing the lower value of the two films having a foamed tie layer to the higher performing of the two comparative examples.

Dart drop performance was improved at all three extruder temperature profiles for all examples using foamed tie layers versus all examples with conventional tie layers.

Clarity

For examples performed with the lower extruder temperature profile, Examples 7 and 8, using foamed tie layers had clarity results of 34.2% and 40.7%, respectively, while comparative Examples 1 and 2 had clarity results of 25% and 33.7%, respectively. This shows Example 7 outperformed Examples 1 and 2 by 37% and 1%, respectively, and Example 8 outperformed Examples 1 and 2 by 21% and 63%, respectively.

For examples performed with the midrange extruder temperature profile, Examples 9 and 10, using foamed tie layers demonstrated clarity results of 53.9% and 40.7%, respectively, while comparative Examples 3 and 4 had clarity results of 26.8% and 23.8%, respectively. This shows an improvement of 52% even when comparing the lower value of the two films having a foamed tie layer to the higher performing of the two comparative examples.

For examples performed with the higher extruder temperature profile, Examples 11 and 12, using foamed tie layers demonstrated clarity results of 60.5 and 55.1%, respectively, while comparative Examples 5 and 6 had clarity results of 48.2% and 26.7%, respectively. This shows an improvement of 14% even when comparing the lower value of the two films having a foamed tie layer to the higher performing of the two comparative examples.

Film clarity was improved or at least maintained in examples using the lower extruder temperature profile, while clarity results for all examples using the midrange and higher extruder temperature profiles showed improved clarity for all examples using foamed tie layers.

Haze

For examples performed with the lower extruder temperature profile, Examples 7 and 8, using foamed tie layers had haze results of 11.68% and 12.52%, respectively, while comparative Examples 1 and 2 had haze results of 12.53% and 12.98%, respectively. This shows Example 7 had reduced haze compared to Examples 1 and 2, and Example 8 reduced or matched haze compared to Examples 1 and 2.

For examples performed with the midrange extruder temperature profile, Examples 9 and 10, using foamed tie layers demonstrated haze results of 13.05% and 12.83%, respectively, while comparative Examples 3 and 4 had haze results of 14.55% and 14.32%, respectively. Both Examples 9 and 10 showed approximately 10% reduction in haze values versus both comparative examples.

For examples performed with the higher extruder temperature profile, Examples 11 and 12, using foamed tie layers demonstrated haze results of 13.8 and 13.47%, respectively, while comparative Examples 5 and 6 had haze results of 15.73% and 15%, respectively. Both Examples 11 and 12 showed more than 10% reduction in haze values versus both comparative examples.

Examples of multilayer film having a foamed tie layer using the lower extruder temperature profile exhibited reduced or equivalent haze, while those using the midrange and higher extruder temperature profiles all showed reduced haze.

DSC

DSC $1^{st}$ peak and DSC $2^{nd}$ peak indicates the melt temperatures for the components in the outer layer composition while DSC $3^{rd}$ peak the melt temperature for the base layer composition. Higher DSC AH values for the examples with foamed tie layers indicate a higher enthalpy state for the multilayer film. Since the only change for these examples versus the comparative examples, this higher enthalpy indicates more solidification or crystallinity in the foamed tie layer, consistent with collapse of the gas cells prior to solidification of the tie layer.

TABLE 3

| Test Parameters | Example No. | | | | | | | | | | | |
|---|---|---|---|---|---|---|---|---|---|---|---|---|
| | 1 | 2 | 3 | 4 | 5 | 6 | 7* | 8* | 9* | 10* | 11* | 12* |
| OL Comp. | P3 | P3 | P3 | P3 | P3 | P3 | P3 | P3 | P3 | P3 | P3 | P3 |
| OL Thickness | 37 | 37 | 37 | 37 | 37 | 37 | 37 | 37 | 37 | 37 | 37 | 37 |
| BL Comp. | P5 | P5 | P5 | P5 | P5 | P5 | P5 | P5 | P5 | P5 | P5 | P5 |
| BL Thickness | 12 | 12 | 12 | 12 | 12 | 12 | 12 | 12 | 12 | 12 | 12 | 12 |
| TL Comp. | TLP3 | TLP1 | TLP3 | TLP1 | TLP3 | TLP1 | TLP2 | TLP4 | TLP2 | TLP4 | TLP2 | TLP4 |
| TL Thickness | 7 | 7 | 7 | 7 | 7 | 7 | 7 | 7 | 7 | 7 | 7 | 7 |
| TL Cyl. 1 Temp. (° C.) | 190 | 190 | 225 | 225 | 225 | 225 | 190 | 190 | 225 | 225 | 225 | 225 |
| TL Cyl. 2 Temp. (° C.) | 200 | 200 | 230 | 230 | 260 | 260 | 200 | 200 | 230 | 230 | 260 | 260 |
| TL Cyl. 3 Temp. (° C.) | 200 | 200 | 230 | 230 | 260 | 260 | 200 | 200 | 230 | 230 | 260 | 260 |
| TL Adapter Temp. (° C.) | 200 | 200 | 230 | 230 | 260 | 260 | 200 | 200 | 230 | 230 | 260 | 260 |
| TL Die Temp. (° C.) | 200 | 200 | 230 | 230 | 260 | 260 | 200 | 200 | 230 | 230 | 260 | 260 |
| Dart Drop/F50 (g) | 174 | 162 | 198 | 159 | 219 | 171 | 258 | 258 | 300 | 255 | 327 | 309 |

TABLE 3-continued

| Test Parameters | Example No. | | | | | | | | | | | |
|---|---|---|---|---|---|---|---|---|---|---|---|---|
| | 1 | 2 | 3 | 4 | 5 | 6 | 7* | 8* | 9* | 10* | 11* | 12* |
| Clarity (NAS, %) | 25 | 33.7 | 26.8 | 23.8 | 48.2 | 27.6 | 34.2 | 40.7 | 53.9 | 40.7 | 60.5 | 55.1 |
| Haze (%) | 12.53 | 12.98 | 14.55 | 14.32 | 15.73 | 16 | 11.68 | 12.52 | 13.05 | 12.83 | 13.8 | 13.47 |
| DSC $1^{st}$ peak (° C.) | 108.5 | 109 | 109 | 108.8 | 108.8 | 108.8 | 108.3 | — | 108.4 | — | 108.3 | — |
| DSC $2^{nd}$ peak (° C.) | 118.7 | 119 | 118.8 | 118.8 | 118.9 | 118.6 | 118.4 | — | 118.3 | — | 118.2 | — |
| DSC $3^{rd}$ peak (° C.) | 182.3 | 182.5 | 182.2 | 182 | 181.7 | 181.8 | 182.2 | — | 181.8 | — | 181.5 | — |
| DSC ΔH (J/g) | 118.3 | 113.4 | 114.2 | 113.2 | 112.5 | 115 | 118.5 | — | 119.2 | — | 120.7 | — |

Examples 13-16

Test conditions and film performance results for Examples 13-16 are shown in Table 4. Examples 13-16 were all layer thickness configuration 40/4/12/4/40. Outer layers and base layers are common in all examples in order to demonstrate the performance differences of the multilayer films resulting from different tie-layer composition.

Examples 13, 14, 15, and 16 all have a common higher temperature profile for the extruder.

Example 13 uses a tie layer of a commercial olefin-based adhesive composition without foaming agent, and Example 14 uses the same composition prepared in the laboratory, and Example 15 and 16 use a tie layer of the same composition containing 1000 ppm and 2000 ppm of the same foaming agent, respectively.

Dart Drop

For examples performed with the higher extruder temperature profile, Examples 15 and 16, using foamed tie layers demonstrated dart drop results of 303 g and 312 g, respectively, while comparative Examples 13 and 14 had dart drop results of 213 g and 177 g, respectively. This shows an improvement of from 42% even when comparing the lower value of the two films having a foamed tie layer to the higher performing of the two comparative examples.

dart drop performance was improved for both examples using foamed tie layers when compared to both examples with conventional tie layers.

Clarity

For examples performed with the lower extruder temperature profile, Examples 15 and 16, using foamed tie layers had clarity results of 58.8% and 55.9%, respectively, while comparative Examples 13 and 14 had clarity results of 43.5 and 31.87%, respectively. This shows an improvement of 29% even when comparing the lower value of the two films having a foamed tie layer to the higher performing of the two comparative examples.

Clarity performance was improved for both examples using foamed tie layers when compared to both examples with conventional tie layers.

Haze

For examples performed with the lower extruder temperature profile, Examples 15 and 16, using foamed tie layers had haze results of 14.18% and 14.6%, respectively, while comparative Examples 13 and 14 had clarity results of 15.6% and 15.87%, respectively. This shows a reduction of measured haze value of 6% even when comparing the higher value of the two films having a foamed tie layer to the lower haze value of the two comparative examples.

Haze performance was improved for both examples using foamed tie layers when compared to both examples with conventional tie layers.

DSC

DSC $1^{st}$ peak and DSC $2^{nd}$ peak indicates the melt temperatures for the components in the outer layer composition while DSC $3^{rd}$ peak the melt temperature for the base layer composition. Higher DSC ΔH values for the examples with foamed tie layers indicate a higher enthalpy state for the multilayer film. Since the only change for these examples versus the comparative examples, this higher enthalpy indicates more solidification or crystallinity in the foamed tie layer, consistent with collapse of the gas cells prior to solidification of the tie layer.

TABLE 4

| | Example No. | | | |
|---|---|---|---|---|
| Test Parameters | 13 | 14 | 15* | 16* |
| OL Comp. | P3 | P3 | P3 | P3 |
| OL Thickness | 40 | 40 | 40 | 40 |
| BL Comp. | P5 | P5 | P5 | P5 |
| BL Thickness | 12 | 12 | 12 | 12 |
| TL Comp. | TLP3 | TLP1 | TLP2 | TLP4 |
| TL Thickness | 4 | 4 | 4 | 4 |
| TL Cyl. 1 Temp. (° C.) | 225 | 225 | 225 | 225 |
| TL Cyl. 2 Temp. (° C.) | 260 | 260 | 260 | 260 |
| TL Cyl. 3 Temp. (° C.) | 260 | 260 | 260 | 260 |
| TL Adapter Temp. (° C.) | 260 | 260 | 260 | 260 |
| TL Die Temp. (° C.) | 260 | 260 | 260 | 260 |
| Dart Drop/F50 (g) | 213 | 177 | 303 | 312 |
| Clarity (NAS, %) | 43.5 | 31.8 | 58.8 | 55.9 |
| Haze (%) | 15.6 | 15.8 | 14.18 | 14.6 |
| DSC $1^{st}$ peak (° C.) | 108.6 | 108.8 | 108.4 | — |
| DSC $2^{nd}$ peak (° C.) | 118.6 | 118.5 | 118.1 | — |
| DSC $3^{rd}$ peak (° C.) | 181.7 | 182 | 181.5 | — |
| DSC ΔH (J/g) | 114.7 | 112.8 | 119.1 | — |

Examples 17-19

Test conditions and film performance results for Examples 17-19 are shown in Table 5. Examples 17-19 were all layer thickness configuration 40/4/12/4/40. Outer layers, base layers, and tie layers are common in all examples in order to demonstrate the effects of temperature at the extruder die of a tie layer containing a foaming agent on the performance of the multilayer films produced. Examples 17, 18, and 19 have temperatures measured at the extruder die of 190° C., 221° C., and 230° C., respectively.

Example 17 is a comparative example as the temperature of the tie layer was insufficient to activate significant foaming, if any, of the tie layer. Both Examples 18 and 19, where tie layer temperatures were sufficient to foam the tie layers showed improved dart drop, higher clarity, and reduced haze relative to comparative Example 17.

TABLE 5

| Test Parameters | Ex. 17 | Ex. 18* | Ex. 19* |
|---|---|---|---|
| OL Comp. | P3 | P3 | P3 |
| OL Thickness | 37 | 37 | 37 |
| BL Comp. | P5 | P5 | P5 |
| BL Thickness | 12 | 12 | 12 |
| TL Comp. | TLP2 | TLP2 | TLP2 |
| TL Thickness | 7 | 7 | 7 |
| TL Die Temp. (° C.) | 190 | 221 | 230 |
| Dart Drop/F50 (g) | 117.5 | 236 | 245 |
| Clarity (NAS, %) | 13.4 | 43.7 | 27 |
| Haze (%) | 12.10 | 10.98 | 9.08 |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the processes, machines, film structures, composition of layers, means, methods, and/or steps described in the specification. As one of the ordinary skill in the art will readily appreciate from the disclosure of the present invention, processes, machines, film structures, composition of layers, means, methods, and/or steps, presently existing or later to be developed that perform substantially the same function or achieve substantially the same result as the corresponding embodiments described herein, may be utilized according to the present invention. Accordingly, the appended claims are intended to include within their scope such processes, machines, film structures, composition of layers, means, methods, and/or steps.

What is claimed is:

1. A film comprising:
   a. a base layer;
   b. a first outer layer; and
   c. a first tie layer disposed between the first outer layer and the base layer, the first tie layer comprising a first foamed polyolefin-based adhesive composition, wherein the first foamed polyolefin-based adhesive composition comprises a LLDPE and a HDPE-g-MAH, wherein the HDPE-g-MAH is functionalized with maleic anhydride, and
      wherein the first foamed polyolefin-based adhesive composition comprises a dispersed phase of gas cells and wherein at least a portion of the gas cells are at least partially collapsed.

2. The film of claim 1 wherein the first foamed polyolefin-based adhesive composition comprises the reaction product of:
   a. adding a polyolefin-based adhesive composition and a gas to an extruder;
   b. mixing the polyolefin-based adhesive composition and the gas in the extruder at pressure and temperature conditions sufficient to form a mixture of melted polyolefin-based adhesive composition and dissolved gas;
   c. discharging the mixture from a die attached to the extruder to reduce the pressure of the mixture an amount sufficient to produce a matrix of melted polyolefin-based adhesive composition comprising a dispersed phase of gas cells; and
   d. decreasing the temperature of the matrix of melted polyolefin-based adhesive composition comprising a dispersed phase of gas cells at a rate to induce collapse of at least a portion of the gas cells prior to solidification of the polyolefin-based adhesive composition.

3. The film of claim 2 wherein the gas is produced in the extruder by thermal decomposition of a chemical foaming agent.

4. The film of claim 3 wherein the chemical foaming agent comprises an azo foaming agent, a nitroso foaming agent, an azide foaming agent, a bicarbonate foaming agent, or combinations thereof.

5. The film of claim 2 wherein the gas is added into the extruder from an external source.

6. The film of claim 2 wherein the gas is nitrogen, carbon-dioxide, or a mixture thereof.

7. The film of claim 2 wherein the polyolefin-based adhesive composition comprises a reaction product of a mixture of:
   a. the LLDPE; and
   b. the HDPE-g-MAH;
   wherein the mixture is heated and melt blended at a temperature sufficient to melt at least a portion of the LLDPE and at least a portion of the HDPE-g-MAH.

8. The film of claim 7 wherein the HDPE-g-MAH comprises a reaction product of a mixture of:
   a. an HDPE; and
   b. maleic anhydride;
   wherein maleic anhydride is grafted to the HDPE by reactive extrusion or a solution process.

9. The film of claim 8 wherein the HDPE-g-MAH is present in a range from 0.5 to 30 wt. %, based on the total weight of the polyolefin-based adhesive composition.

10. The film of claim 9 wherein the maleic anhydride is present in an amount ranging from 0.2 to 20 wt. %, based on the total weight of the HDPE-g-MAH.

11. The film of claim 7 wherein the LLDPE has a density from 0.910 to 0.930 g/cm$^3$.

12. The film of claim 1 wherein the first outer layer comprises a polyethylene homopolymer, a copolymer or units derived from ethylene and units derived from one or more ethylenically unsaturated $C_3$-$C_8$ nonpolar comonomers, a polypropylene homopolymer, a copolymer or units derived from propylene and units derived from one or more of ethylene and ethylenically unsaturated $C_4$-$C_{10}$ nonpolar comonomers, or combinations thereof.

13. The film of claim 1 wherein the base layer comprises an ethylene-vinyl-alcohol copolymer, a polyamide, or combinations thereof.

14. The film of claim 1 further comprising:
   a. a second outer layer; and
   b. a second tie layer disposed between the second outer layer and the base layer, the second tie layer comprising a second foamed polyolefin-based adhesive composition.

15. The film of claim 14 wherein the first foamed polyolefin-based adhesive composition comprises the reaction product of:
   a. adding a polyolefin-based adhesive composition and a gas to an extruder;
   b. mixing the polyolefin-based adhesive composition and the gas in the extruder at pressure and temperature conditions sufficient to form a mixture of melted polyolefin-based adhesive composition and dissolved gas;
c. discharging the mixture and dissolved gas from a die attached to the extruder to reduce the pressure of the mixture an amount sufficient produce a matrix of melted polyolefin-based adhesive composition comprising gas cells; and
d. decreasing the temperature of the matrix of melted polyolefin-based adhesive composition comprising gas cells at a controlled rate to induce collapse of at least a portion of the gas cells prior to solidification of the polyolefin-based adhesive composition.

* * * * *